No. 781,474.                                              Patented January 31, 1905.

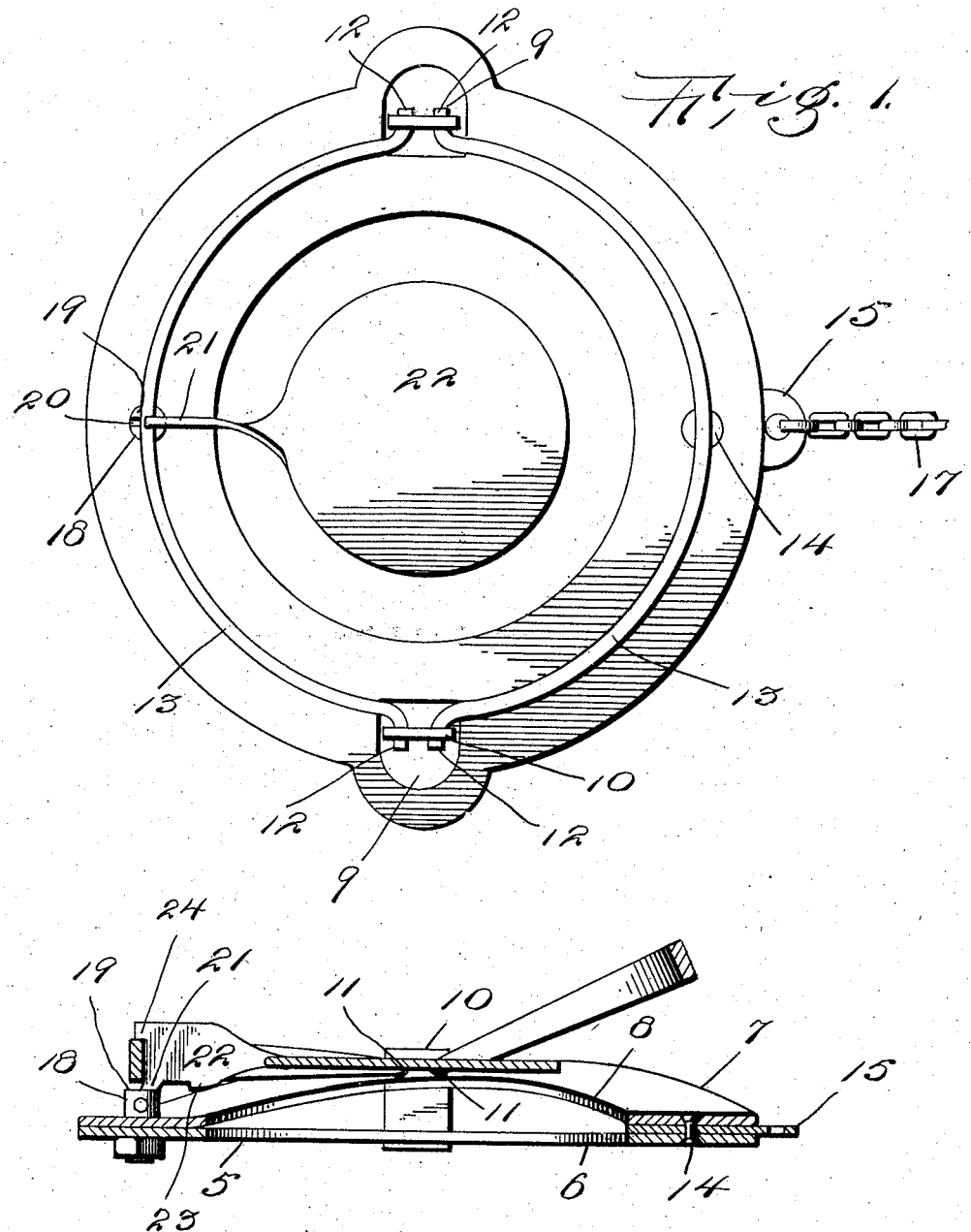

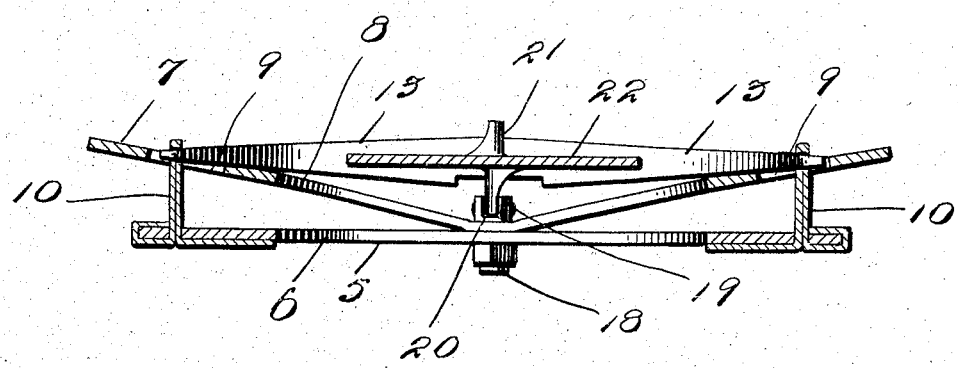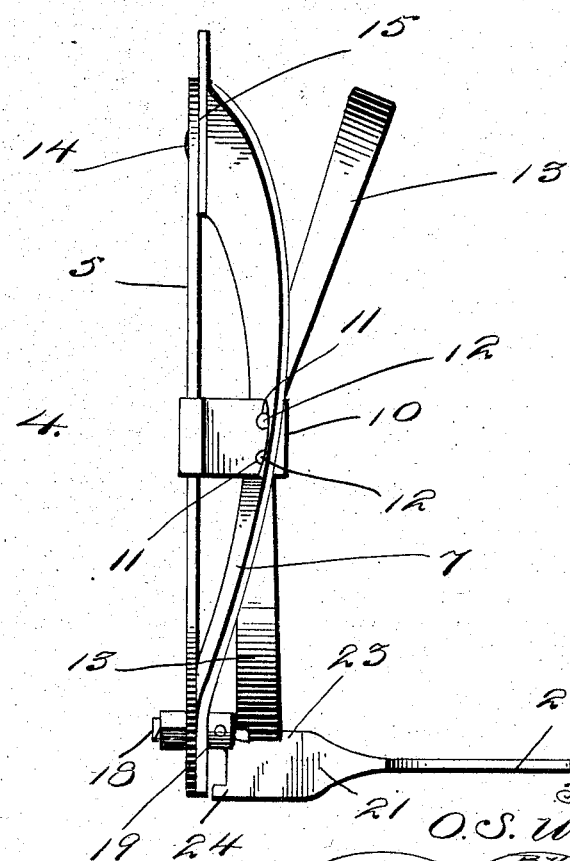

UNITED STATES PATENT OFFICE.

ODE S. UNDERWOOD, OF ROSEVILLE, ILLINOIS.

STEEL TRAP.

SPECIFICATION forming part of Letters Patent No. 781,474, dated January 31, 1905.

Application filed May 26, 1904. Serial No. 209,890.

*To all whom it may concern:*

Be it known that I, ODE S. UNDERWOOD, a citizen of the United States, residing at Roseville, in the county of Warren, State of Illinois, have invented certain new and useful Improvements in Steel Traps; and I do hereby declare the following to be a full, clear, and exact description of the invention, such as will enable others skilled in the art to which it appertains to make and use the same.

This invention relates to traps, and more particularly to the class of steel traps, and has for its object to provide a trap which will be simple of construction and cheap of manufacture and which will be so arranged that it may be set to catch the victim by the leg or around the neck, as desired.

In the drawings forming a portion of this specification, and in which like numerals of reference indicate similar parts in the several views, Figure 1 is a top plan view of the trap set to catch an animal by the leg. Fig. 2 is a transverse vertical section through the structure shown in Fig. 1. Fig. 3 is a section at right angles to Fig. 2. Fig. 4 is a side elevation showing the trap set to catch an animal by the neck.

Referring now to the drawings, the present invention comprises a circular plate 5, having an opening 6 in its center, to the upper side of which there is secured a spring-plate 7, having an opening 8 therethrough which alines with and corresponds to the opening 6. The spring-plate 7 is secured to the plate 5 at opposite points, and between these points the plates extend upwardly in an arc, as shown, and is provided with openings 9 at opposite points adjacent to its edges, which are midway between the points of attachment of the plate 7 to the plate 5, and these openings 9 lie above lugs 10, which extend upwardly from the plate 5 and have pairs of perforations 11 therethrough, the perforations of one lug alining with those of the other. Engaged with the alining perforations of the two lugs are the angular lugs 12 of jaws 13, which are movable pivotally with respect to the lugs and which are held normally in engagement with each other by the upwardly-extending portion of the plate 7 with the openings 9 of which they are engaged, it being understood, however, that these portions of the plate 7 may be moved downwardly to bring the openings 9 below the ends of the jaws 13 to permit of separation of the jaws and that the jaws may be held separated to prevent the return of the plate to its normal position.

At one side the plate 7 is secured to the plate 5 by means of a rivet 14, which also holds a plate 15 between the plates 5 and 7, the plate 15 being provided with a perforation to which a chain 17 is attached. At the opposite side the plates 5 and 7 are secured together by means of a bolt 18, having a slotted head 19, in the slot 20 of which there is pivoted the stem 21 of a trip-plate 22, which is movable to lie above the openings 6 and 8 or to extend outwardly at right angles to the plate 5. The stem 21 is provided with a lug 23 on its edge, which lies in the direction of the plate 7, and with a similar lug 24 on its rearward edge, and when the plate 22 lies above the openings 6 and 8 the lug 24 is in position to engage one of the jaws 13 to hold these jaws separated, as shown in Fig. 1. When the trap is thus set, it may be disposed with the plate 5 upon the ground, and should an animal step upon the plate 22 the lug 24 will be disengaged from the jaw 13 and the jaws will be moved by the plate 7 to bring their coöperating edges together to confine the leg of the animal therebetween.

When it is desired to set the trap so that the animal will be caught by the neck, the parts are disposed as shown in Fig. 2, the lug 23 being engaged with one of the jaws 13, as shown, and the plate 22 extending outwardly at right angles to the plate 5. The trap is now placed in such a way that the animal in leaving its burrow or in passing from place to place will be forced to pass through the openings 6 and 8, and in so doing the animal will step upon the plate 22, which will release the jaw 13 and permits the jaws to be brought together by the plate 7. If desired, bait may be placed upon the trip-plate 22 to attract the animal to the trap.

In practice modifications of the specific construction shown may be made and any suitable materials and proportions may be used for the various parts without departing from the spirit of the invention.

What is claimed is—

1. A trap comprising a plate, coöperating jaws pivotally connected with the plate, a trip-plate pivotally connected with the first-named plate and movable to lie parallel therewith or to extend at right angles therefrom, lugs carried by the trip-plate, one of said lugs being arranged for engagement with one of the jaws when the plate is in its first-named position to hold the jaws separated, the remaining lug being disposed for engagement with said jaw when the trip-plate is in its second-named position to hold the jaws separated, and means for moving the jaws into engagement with each other and for holding them yieldably in such position when the lugs are out of engagement with the jaw.

2. A trap comprising a plate having an opening therethrough and having lugs at opposite sides of the opening, coöperating jaws pivotally connected with the lugs and movable into and out of engagement with each other, means for holding the jaws yieldable in engagement with each other, and a trip-plate pivotally connected with the first-named plate and movable to lie parallel therewith and to extend at right angles therefrom, said trip-plate having lugs thereon for engagement with one of the jaws to hold the holding means in inoperative position, one of said lugs being disposed for engagement with the jaw when the trip-plate is in its first-named position and the remaining lug being disposed for such engagement when the trip-plate is in its second-named position, said plate being movable upon its pivot to disengage its lug from the jaw to permit of the movement of the jaws under the action of the holding means.

In testimony whereof I affix my signature in presence of two witnesses.

ODE S. UNDERWOOD

Witnesses:
 RUFUS LANCE,
 GEO. H. ANDERSON.